(12) United States Patent
Pesteil et al.

(10) Patent No.: US 9,650,896 B2
(45) Date of Patent: May 16, 2017

(54) TURBINE ENGINE BLADE HAVING IMPROVED STACKING LAW

(75) Inventors: Agnes Pesteil, Alfortville (FR); Vincent Perrot, Maisons Alfort (FR)

(73) Assignee: SNECMA, Paris (FR)

( * ) Notice: Subject to any disclaimer, the term of this patent is extended or adjusted under 35 U.S.C. 154(b) by 748 days.

(21) Appl. No.: 13/993,079

(22) PCT Filed: Dec. 15, 2011

(86) PCT No.: PCT/FR2011/053000
§ 371 (c)(1),
(2), (4) Date: Jun. 11, 2013

(87) PCT Pub. No.: WO2012/080669
PCT Pub. Date: Jun. 21, 2012

(65) Prior Publication Data
US 2013/0266451 A1 Oct. 10, 2013

(30) Foreign Application Priority Data
Dec. 15, 2010 (FR) ..................................... 10 60538

(51) Int. Cl.
*F01D 5/14* (2006.01)
*F01D 5/20* (2006.01)
*F04D 29/32* (2006.01)

(52) U.S. Cl.
CPC ............... *F01D 5/14* (2013.01); *F01D 5/141* (2013.01); *F01D 5/145* (2013.01); *F01D 5/20* (2013.01);
(Continued)

(58) Field of Classification Search
CPC ... F01D 5/14; F01D 5/20; F01D 5/141; F01D 5/145; F04D 29/324; F04D 29/667; F05D 2240/307
See application file for complete search history.

(56) References Cited

U.S. PATENT DOCUMENTS 1,469,973 A * 10/1923 Thompson ............. F01D 5/048
416/144
2,714,499 A * 8/1955 Warner .................... F01D 5/16
416/243

(Continued)

FOREIGN PATENT DOCUMENTS

CA 2068539 A1 3/1992
EP 1 953 344 8/2008
(Continued)

OTHER PUBLICATIONS

U.S. Appl. No. 14/361,594, filed May 29, 2014, Perrot, et al.
(Continued)

*Primary Examiner* — Craig Kim
*Assistant Examiner* — Eldon Brockman
(74) *Attorney, Agent, or Firm* — Oblon, McClelland, Maier & Neustadt, L.L.P.

(57) ABSTRACT

A turbine engine blade, including an airfoil which extends radially between a blade root and an airfoil tip, axially between a leading edge and a trailing edge, and tangentially between a pressure side and a suction side, the profile of the blade having a series of basic profiles, in a form of a vane section, stacked on one another along a stacking line connecting the center of gravity of all the vane sections. The projection of the stacking line of the airfoil on at least one plane extending radially from the blade root includes a double tangential inversion of the direction of the curvature thereof, located in the last thirty percent of the height of the airfoil, the projection plane being positioned substantially perpendicular to the chord of the blade.

14 Claims, 4 Drawing Sheets

(52) U.S. Cl.
CPC ...... *F04D 29/324* (2013.01); *F05D 2240/307* (2013.01); *F05D 2250/713* (2013.01)

(56) References Cited

U.S. PATENT DOCUMENTS

| | | | | |
|---|---|---|---|---|
| 5,525,038 | A * | 6/1996 | Sharma | F01D 5/141 |
| | | | | 416/223 A |
| 6,071,077 | A | 6/2000 | Rowlands | |
| 6,079,948 | A * | 6/2000 | Sasaki | F01D 5/141 |
| | | | | 415/191 |
| 6,331,100 | B1 * | 12/2001 | Liu | F01D 5/141 |
| | | | | 416/223 A |
| 6,341,942 | B1 * | 1/2002 | Chou | F01D 5/141 |
| | | | | 416/223 A |
| 7,789,631 | B2 * | 9/2010 | Hoeger | F04D 21/00 |
| | | | | 416/228 |
| 8,425,185 | B2 * | 4/2013 | Myoren | F01D 5/141 |
| | | | | 415/192 |
| 8,480,372 | B2 * | 7/2013 | Sparks | F01D 5/20 |
| | | | | 416/223 A |
| 2004/0136830 | A1 | 7/2004 | Eguchi et al. | |
| 2008/0213098 | A1 * | 9/2008 | Neef | F01D 5/20 |
| | | | | 416/223 A |
| 2009/0013532 | A1 * | 1/2009 | Wood | F01D 5/141 |
| | | | | 29/889.7 |
| 2010/0150729 | A1 * | 6/2010 | Kirchner | F01D 5/12 |
| | | | | 416/223 R |

FOREIGN PATENT DOCUMENTS

| | | |
|---|---|---|
| JP | 2004-257380 A | 9/2004 |
| JP | 2008-190531 A | 8/2008 |
| JP | 2010-203250 A | 9/2010 |

OTHER PUBLICATIONS

International Search Report Issued Mar. 3, 2012 in PCT/FR11/053000 Filed Dec. 15, 2011.

Office Action issued Nov. 4, 2015 in Japanese Patent Application No. 2013-543865 (submitting English translation only).

\* cited by examiner

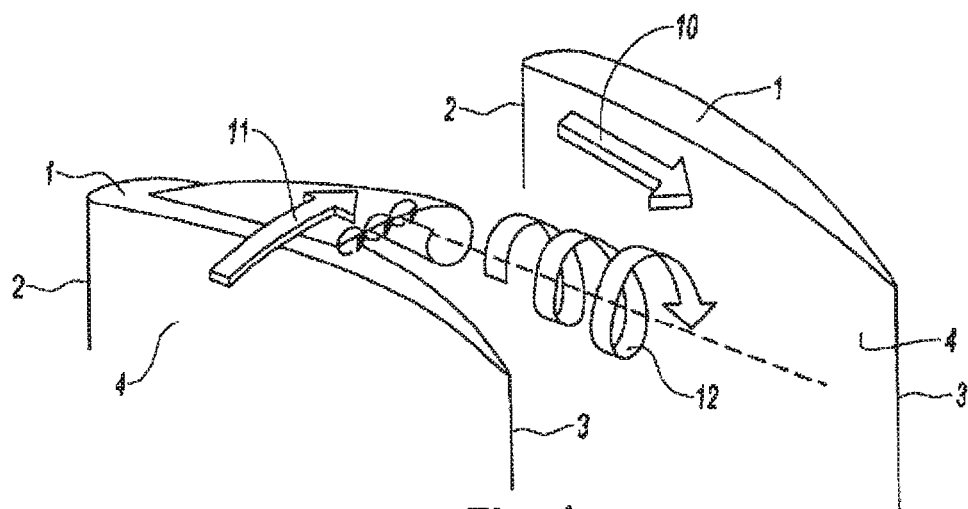
Fig. 1
Background Art
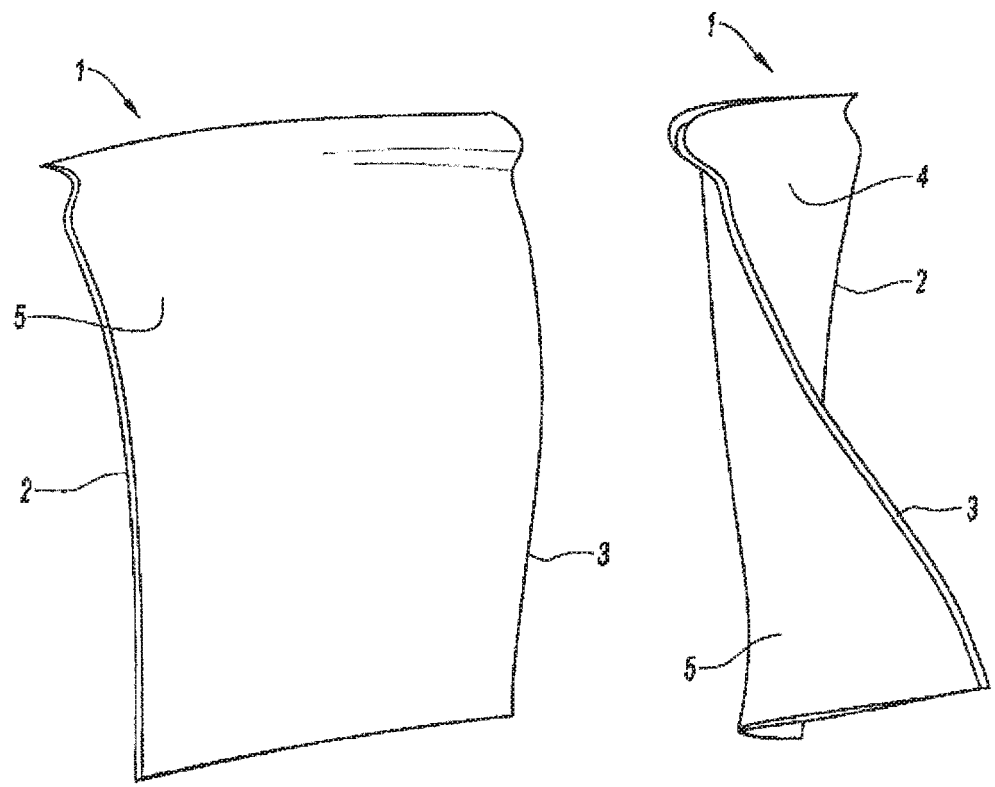
Fig. 2   Fig. 3

TURBINE ENGINE BLADE HAVING IMPROVED STACKING LAW

BACKGROUND OF THE INVENTION

Field of the Invention

The field of the present invention is that of thermodynamics and more specifically that of the blades for the compressors of turbomachines.

Description of the Related Art

Aeronautical turbomachines are conventionally made up, from upstream to downstream in the direction in which the gases flow, of a fan, of one or more compressor stages, for example a low-pressure compressor and a high-pressure compressor, a combustion chamber, one or more turbine stages, for example a high-pressure turbine and a low-pressure turbine, and a gas exhaust nozzle. The compressor or compressors are produced in the form of a plurality of sets of rotor blading rotating past a plurality of sets of stator blading known as guide vanes. The rotor blading is arranged evenly at the periphery of a disk driven by the rotor of the turbomachine, and their airfoils extend radially between the rotor disk and a casing enclosing the airflow path.

Each rotor blade comprises a pressure face over which the air of the flow path is at a raised pressure with respect to the mean pressure prevailing in the vicinity of the blade airfoil, and a suction face over which the air is at a reduced pressure in relation to this mean pressure. This then causes an air circuit to become established at the outer tip of the blade, causing air to pass from the pressure face to the suction face through the clearance there is between the blade and the casing. In the known way, this circulation of air develops along the entire length of the chord of the blade and takes the form of a vortex, referred to as the blade tip clearance vortex, which spreads downstream of the trailing edge of the blade.

The presence of this vortex disturbs the flow in the stages further downstream of the compressor and creates losses which are detrimental to the efficiency of the compressor. It would therefore be desirable to eliminate this vortex or at the very least, to reduce the flow rate of air it carries.

Attempts have been made to try to control this vortex, these for example including treatments applied to the casing surrounding the compressor or the creation of "trenches", namely cavities hollowed into the casing. One example of such treatments is described in the applicant's patent application published under the number FR 2940374. All of these have the disadvantage of generating additional cost in producing the turbomachine and of potentially impairing the performance of the compressor in terms of efficiency at certain operating points.

Patent applications have also been filed in an attempt to reduce the impact that this vortex has on the efficiency of a compressor or turbine stage, these including for example applications US 2010/0054946 or EP 1953341. These applications plan to modify the shape of the blades by altering the shape given to the leading edge, i.e. by altering its sweep angle between the root and the tip of the blade along this leading edge. They do not, with the exception of FIG. 12 of the American publication, provide any indication regarding changes to the line of stacking of the elemental profiles along the height of the blade.

Moreover, U.S. Pat. No. 6,341,942 describes undulations along the height of a compressor blade for the purpose of increasing the flexural rigidity thereof, without an increase in its mass. Although it indicates that one undulation may be situated in a position high up on the blade, it does not specify the position of the point of inversion of curvature associated therewith, nor a fortiori does it indicate the position of the lower point of inflection in the case of a double inflection. Moreover, by highlighting the problem of the vibrational behavior of the blade, it is not, a priori, of any benefit to a person skilled in the art wondering how to improve the efficiency of a stage by controlling the blade tip clearance vortex.

BRIEF SUMMARY OF THE INVENTION

It is an object of the present invention to improve as far as possible the efficiency of a compressor or turbine stage of a turbomachine by giving the blade a special shape that reduces the impact of this leakage flow between the pressure face and the suction face of the airfoil without any need to modify the compressor casing.

To this end, one subject of the invention is a turbomachine blade, the airfoil of which extends radially between a blade root and an airfoil tip, axially between a leading edge and a trailing edge, and tangentially between a pressure face and a suction face, the profile of said blade being made up of a series of elementary profiles, in the form of vane sections, stacked on one another along a line known as the stacking line joining the center of gravity of all of the sections, characterized in that the projection of said stacking line of the airfoil onto at least one plane extending radially from the blade root comprises a double tangential inversion of the direction of its curvature which inversion is situated in the last 30 percent of the height of the airfoil, the plane of projection being oriented substantially perpendicular to the chord of the blade.

These stacking modifications make it possible, through better guidance of the flow, to reduce the blade tip clearance vortex generated by the airfoil.

Indeed, calculations have shown that the beneficial effect provided by the invention is no longer maintained if the inversion is positioned lower down than these last 30 percent. The impact that any undulations further away from the blade tip might have would be small because of the weak extent to which they interfere with the blade tip clearance vortex.

As a preference, the two points of tangential inversion are situated in the last 10 percent of the height of the airfoil.

In another particular embodiment, the blade further comprises an axial inversion, the plane of projection being oriented substantially parallel to the chord of the blade.

For preference, said projection contains a double radial inversion.

The invention also relates to a compressor or to a turbine for a turbomachine comprising at least one rotor wheel made up of blades as described hereinabove, and to a turbomachine comprising such a compressor or such a turbine.

The invention will be better understood, and other objects, details, features and advantages thereof will become more clearly apparent during the course of the detailed explanatory description which will follow of several embodiments of the invention which are given by way of purely illustrative and nonlimiting examples with reference to the attached schematic drawings.

In the remainder of the description, the references axial and tangential are to be understood to be with reference to the axis of rotation of the turbomachine, the axial direction coinciding with this axis of rotation and the tangential direction being oriented along a tangent to the circumference of the turbomachine. By convention in the remainder of the description, the direction referred to as axial with reference to a blade is substantially that of a line parallel to the chord at the tip of the blade, whereas the direction referred to as tangential corresponds substantially to a direction perpendicular to the chord at the tip of the blade.

BRIEF DESCRIPTION OF THE SEVERAL VIEWS OF THE DRAWINGS

In these drawings:

FIG. 1 is a perspective view of two adjacent blades of a compressor according to the prior art;

FIG. 2 is a face-on view of a compressor blade according to a first embodiment of the invention;

FIG. 3 is a profile view of the blade of FIG. 2;

DETAILED DESCRIPTION OF THE INVENTION

Figure 4:
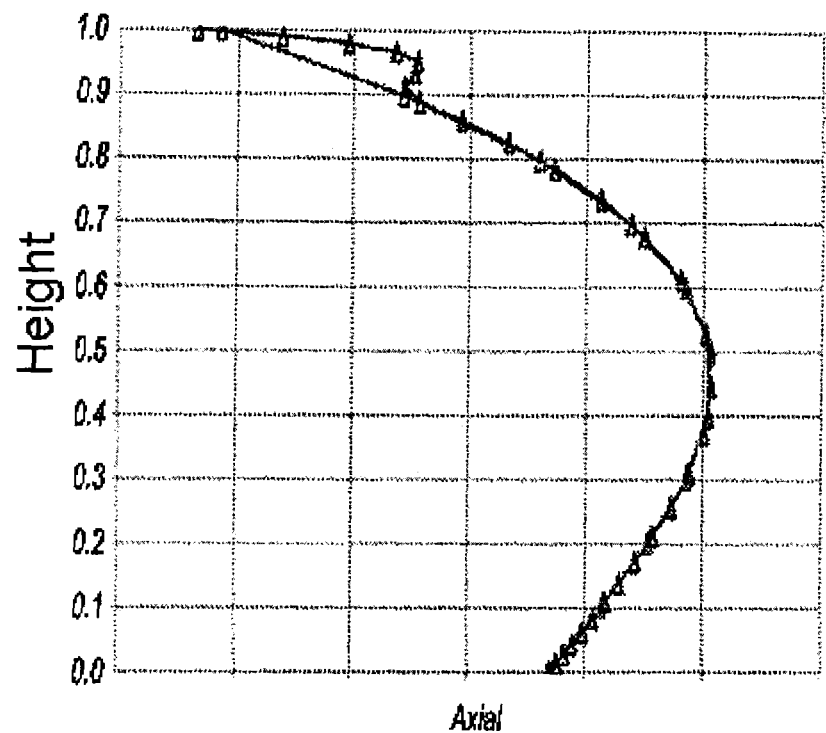
FIGS. 4 and 5 show the changes along the stack of the profiles applied to a blade, respectively axially and tangentially, according to the first embodiment.

Reference is made to FIG. 1 which shows two blades 1 of a compressor of an aeronautical turbomachine according to the prior art, extending between a leading edge 2 and a trailing edge 3, with a pressure face 4 and a suction face 5. The two blades depicted are positioned side by side and guide the main flow 10 of the stream of air that is to be compressed. Because of the raised pressure there is on the pressure face 4 of each blade 1 and because of the reduced pressure there is on the suction face 5 thereof, a leakage flow 11, directed from the pressure face toward the suction face, is set up at the top end of the blade, at the clearance between this blade tip and the casing. As this flow occurs over the entire length of the chord of the blade 1, it grows into the form of a blade tip clearance vortex 12 which spreads downstream of the blade, along the axis of the chord thereof, thus impairing the efficiency of the compressor.

FIGS. 2 and 3 show the airfoil of a blade 1 according to the invention, face on, viewed from the suction face side 5, and in profile, viewed from the trailing edge 3, respectively. The blade root, normally situated toward the bottom of the figure, has not been depicted. The shape of the airfoil can be defined as a series of elemental profiles, in the form of vane sections, along which the air that is to be compressed flows, these profiles being stacked on one another along a line referred to as the stacking line, starting from the root and ending at the tip of the airfoil, and connecting the centers of gravity of the various sections. The shape of the blade can be defined, except for the changes in the elemental profiles between the bottom part and the top part of the airfoil, by, on the one hand, the rotation applied to the elemental profile according to its position along the height of the airfoil and, on the other hand, the shape given to this stacking line.

In a blade of the prior art, the curvature of the stacking line changes very little between the root and the tip of the airfoil of the blade 1; it generally has a convex shape at its upper part (typically over a region of between 20 and 100% of the height), which means that the direction of curvature of the stacking line is maintained. FIG. 12 of document US 2010/0054946 shows an inversion in the curvature of the blade which is located a short way up the height of the blade and which, because of this low-down positioning, has no influence on the blade tip clearance vortex or on the impact this has on the efficiency of the stage to which the blade belongs.

In the case of the invention and, more particularly, in the case of the blade depicted in FIGS. 2 and 3, this stacking line has two changes in curvature in the axial direction and two changes in curvature in the tangential direction, these changes taking place in the last 10 percent of the height of the airfoil. In the example depicted, the axial change in stacking is said to be positive, the first change in curvature (encountered when progressing from the root toward the tip) causing the stacking to be offset toward the trailing edge. In another embodiment (depicted in FIG. 6), the offset may be negative, the invention anticipating just one change in curvature which therefore brings the stacking back toward the trailing edge from a position that is already highly offset toward the leading edge. As far as the tangential modification to the stacking is concerned, this is positive in FIGS. 2 and 3, i.e. the stacking line deforms in the direction of the suction face in the first change of curvature; and then comes back toward the pressure face in the second change in curvature.

Figure 5:
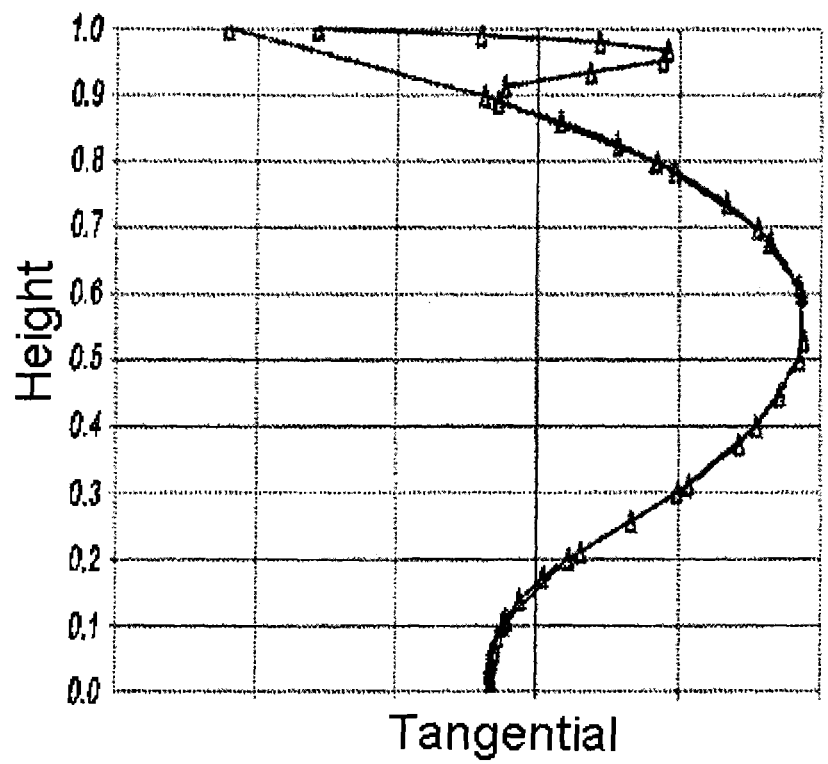

Reference is now made to FIGS. 4 and 5 which show the shape of the stacking line of a blade according to the first embodiment of the invention, in projection along the height of the blade, in planes oriented substantially axially and tangentially respectively, which means parallel or perpendicular to the chord of the blade. In this first embodiment, the change in curvature of the stacking line occurs only over the last 10 percent thereof (these being measured from a zero conventionally considered to be at the root of the blade and measuring toward the tip thereof, the reading at the tip then corresponding to 100%). FIG. 4 shows the axial deformation of the stacking line of the airfoil, i.e. the shape its projection has on a plane oriented radially and parallel to the chord of this airfoil; it shows this deformation in two configurations, one according to the prior art (the convex line) and one according to the invention (the line that has a double change in curvature). FIG. 5 shows the same tangential changes to the stacking line, i.e. the shape of its projection onto a plane oriented radially and perpendicular to the chord of the airfoil. Whereas the blades of the prior art have, axially, a convex shape, i.e. have a curvature which remains of constant sign, the airfoil according to the first embodiment maintains a curvature identical to that of the prior art over 90% of its height, before turning a first time towards the trailing edge and then turning again and returning toward the leading edge; finally, at the tip of the airfoil, it is practically back at the same level as the blade of the prior art. There is therefore a double change in the direction of axial curvature of the airfoil over the last 10 percent of the height thereof. The same phenomenon is encountered in the tangential direction, with an airfoil of the prior art having a curvature of constant sign over the majority of its height, and in any case over its last 80%. The airfoil according to the first embodiment of the invention has the same shape as the prior art over the first 90 percent of its height, before differing from the prior art through the presence of two changes in curvature, a first one which shifts its stacking line toward the suction face, followed by a second one which more or less returns this stacking line to the same position as that of the blade of the prior art.

Figure 6:
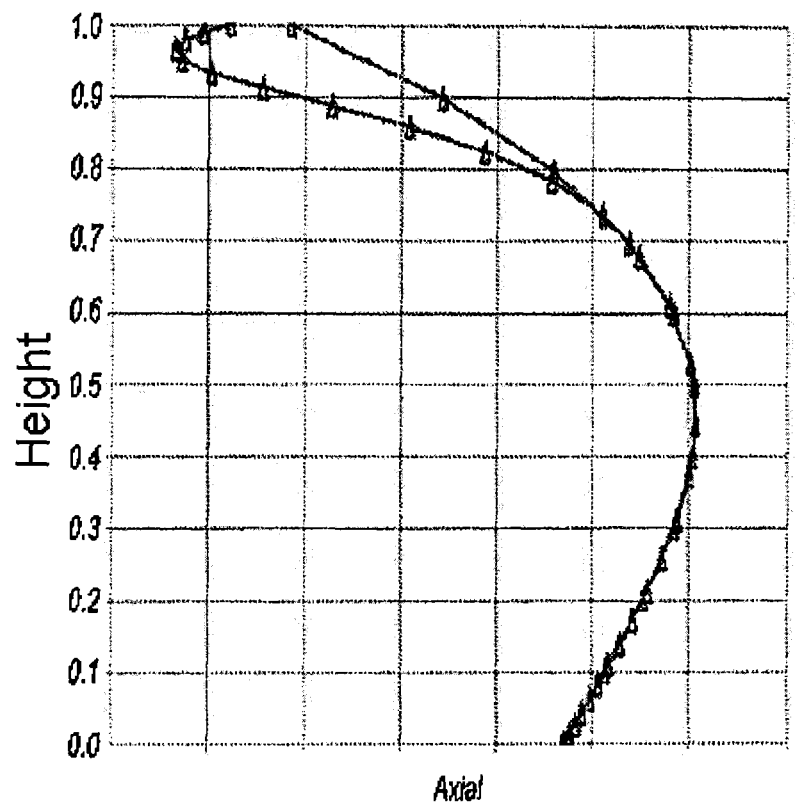
FIGS. 6 and 7 show the changes to the stack of the profiles applied to a blade, respectively axially and tangentially, according to a second embodiment, FIG. 8 provides one example of how the efficiency of a compressor stage comprising rotor blades according to FIG. 2 or 3 is improved.
Figure 7:
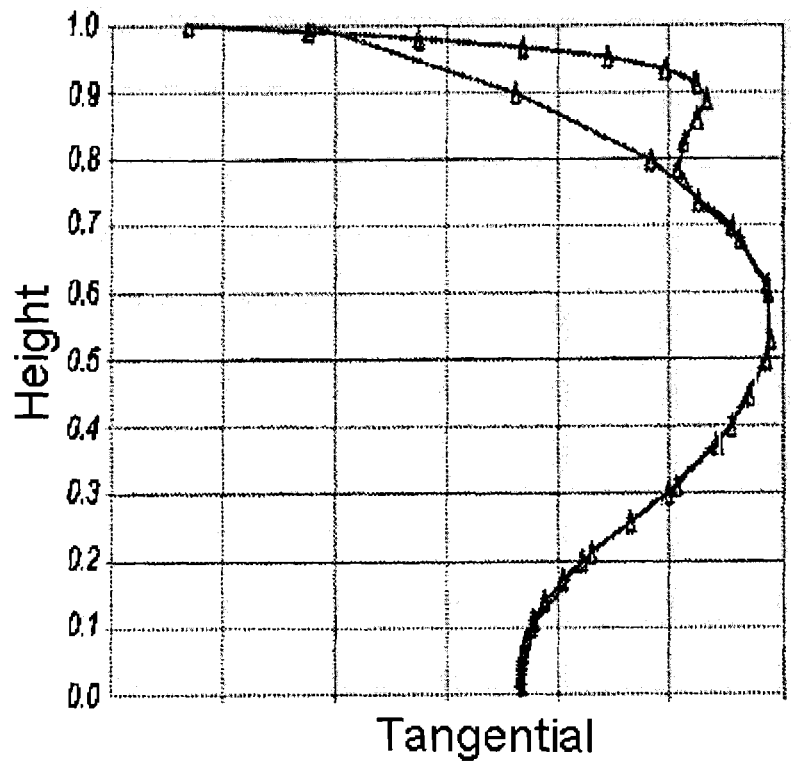

In a similar way, FIGS. 6 and 7 show a second embodiment of the invention, the changes in shape of the stacking line occurring, in this case, over the last 30 percent of the height of the stacking line. In this second embodiment, the axial deformation of the stacking line has just one change in curvature, this change being more pronounced than in the prior art over the first 25 of the last 30 percent, reversing in the last 5% and returning toward the stacking line of the prior art. The tangential deformation for its part has the same double change in the curvature as in the first embodiment.

In both embodiments, as has been illustrated in FIGS. 5 and 7, it may be seen that the tangential deformation of the stacking line flattens in a very pronounced manner as it nears the tip of the blade and that the tangent to this line at the tip becomes contained in the plane tangential to the cylinder that the chord describes at the blade tip when the turbomachine is turning. The same is true of the axial deformation of this stacking line in the first embodiment (cf. FIG. 4).

Figure 8:
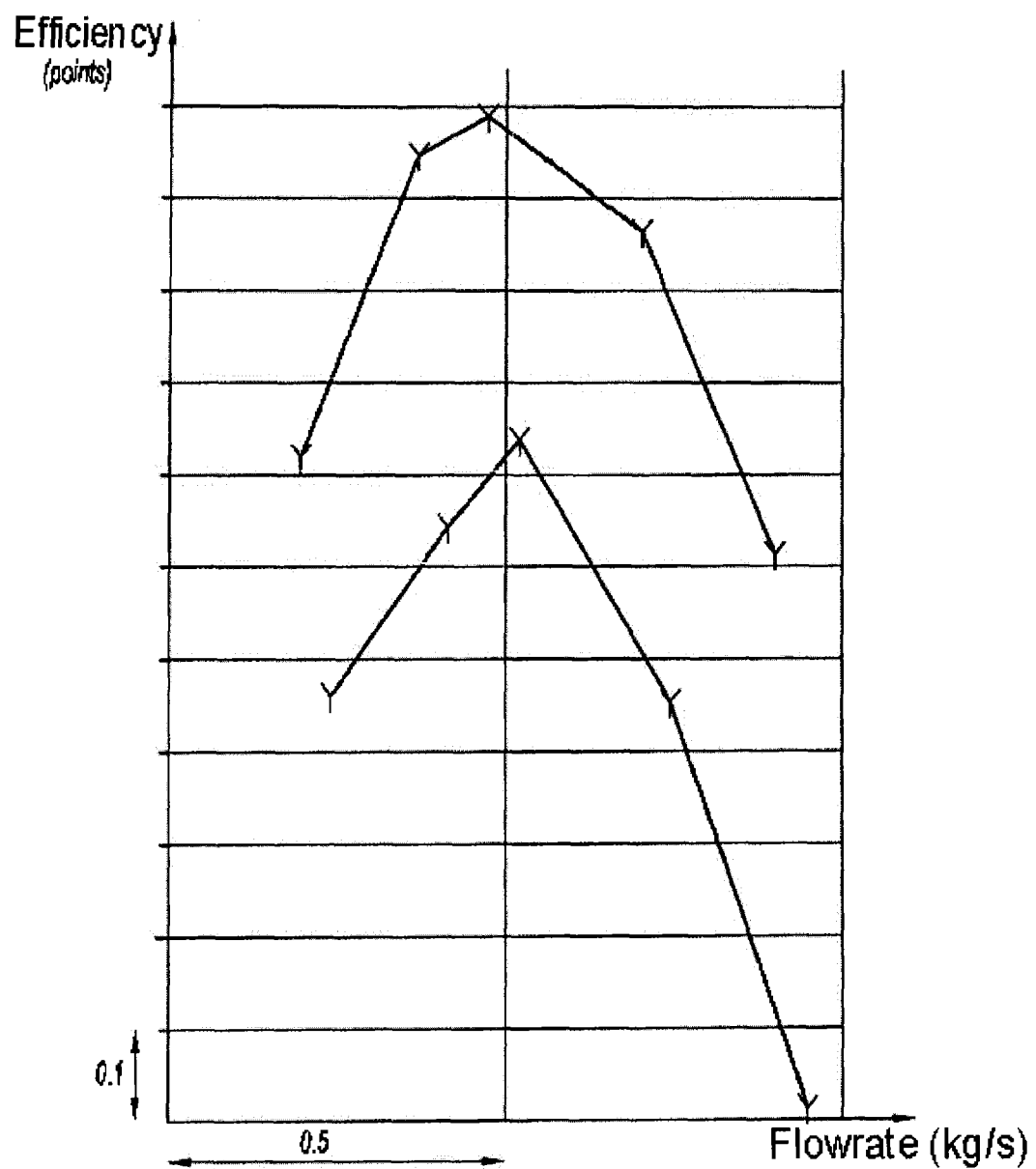

FIG. 8 shows the improvement in performance that is obtained using a three-dimensional Navier-Stokes calculation on a compressor stage according to the invention as compared with a stage produced in the conventional way. The two curves show the points obtained at iso-rotational speed for a stage of the prior art (the curve at the bottom) and a stage according to the invention (the top curve). The abscissa axis represents, in units of 0.5 kg/s per increment, the change in the flow rate of air passing through the stage and the ordinate axis indicates, at a scale of 0.1 point per increment, the efficiency obtained for the various test points. The point furthest to the left represents the point situated on the surging line for this stage and the point furthest to the right represents the point situated on the operating line for the stage, which is, a priori adopted in the design of the compressor. Between the two, the stage passes through a point referred to as the point of maximum efficiency, which is the point aimed for when positioning the operating line for the whole compressor.

The modified blades according to the invention have been evaluated from an aerodynamic standpoint using three-dimensional calculation codes that allow the Navier-Stokes equations to be solved. The results obtained can be set out as follows, for both embodiments, the efficiency of a compressor being defined, on a scale from 0 to 100 points, as the ratio of the work actually applied to the fluid by a given increase in pressure, to the ideal work (isentropic conversion) that would need to be supplied for the same increase in pressure:

for a blade modified over the last 10 percent of the height of the airfoil thereof, there is observed, on average, for each stage, an increase in efficiency of 0.15 points, with respect to the prior art, at the compressor operating line (in a diagram that gives the ratio of pressure obtained as a function of flow rate). On the surge line, the improvement achieved is, on average, around 0.30 points over the prior art. This improvement on the borderline of surge may be converted into an improvement in efficiency on the operating line by moving the operating line closer to the surge line by altering the angles of attack of the blades with respect to the air stream. The contribution of the blading according to the invention therefore represents an appreciable improvement over the bladings of the prior art.

the blades modified over the last 30 percent of their height yield substantially identical results.

by contrast, modifying the blades over a height in excess of these last 30 percent provides no significant additional improvement. The reason for this might be the greater distance of the undulations of the blade from the tip thereof, the influence that these undulations then have on the blade tip clearance vortex then becoming negligible.

The invention has been described in relation to compressor blades. Similar improvements may be obtained on turbine blades which, in the prior art, suffer from the same problem of controlling blade tip clearance vortices.

The invention claimed is:

1. A turbomachine blade, comprising:
   an airfoil which extends radially between a blade root and an airfoil tip, axially between a leading edge and a trailing edge, and tangentially between a pressure face and a suction face,
   a profile of the blade including a series of elementary profiles, in a form of vane sections, stacked on one another along a stacking line joining centers of gravity of all of the sections,
   wherein a projection of the stacking line of the airfoil onto a plane extending radially from the blade root comprises an axial inversion of curvature,
   wherein the axial inversion is situated in a last 30 percent of height of the airfoil, the plane of projection of the axial inversion being oriented substantially parallel to a chord of the blade,
   wherein directions of curvatures of the leading edge and the trailing edge change at a radial position of the axial inversion, and the leading edge and the trailing edge are both axially offset at a same amount and in a same direction from the stacking line at the radial position of the axial inversion, and
   wherein the axial inversion is situated over a last 10 percent of the height of the airfoil.

2. The blade as claimed in claim 1, further comprising a tangential inversion of curvature, the plane of projection of the tangential inversion being oriented substantially perpendicular to the chord of the blade.

3. The blade as claimed in claim 2, wherein the projection includes first and second tangential inversions.

4. The blade as claimed in claim 3, wherein the first and second tangential inversions are situated in the last 30 percent of height of the airfoil, and the first tangential inversion deforms in a direction of the suction face and the second tangential inversion deforms in a direction of the pressure face.

5. A turbomachine compressor comprising at least one rotor wheel made up of blades as claimed in claim 1.

6. A turbomachine comprising a compressor as claimed in claim 5.

7. A turbomachine turbine comprising at least one rotor wheel made up of blades as claimed in claim 1.

8. A turbomachine blade, comprising:
   an airfoil which extends radially between a blade root and an airfoil tip, axially between a leading edge and a trailing edge, and tangentially between a pressure face and a suction face,
   a profile of the blade including a series of elementary profiles, in a form of vane sections, stacked on one another along a stacking line joining centers of gravity of all of the sections,
   wherein a projection of the stacking line of the airfoil onto a plane extending radially from the blade root comprises a double axial inversion of curvature over a last 30 percent of height of the airfoil,
   wherein the plane of projection of each axial inversion of the double axial inversion is oriented substantially parallel to a chord of the blade, and
   wherein directions of curvatures of the leading edge and the trailing edge change at a radial position of each axial inversion of the double axial inversion, and the leading edge and the trailing edge are both axially offset at a same amount and in a same direction from the stacking line at the radial position of each axial inversion of the double axial inversion.

9. The blade as claimed in claim 8, further comprising a tangential inversion of curvature, the plane of projection of the tangential inversion being oriented substantially perpendicular to the chord of the blade.

10. The blade as claimed in claim 9, wherein the projection includes first and second tangential inversions.

11. The blade as claimed in claim 10, wherein the first and second tangential inversions are situated in the last 30 percent of height of the airfoil, and the first tangential inversion deforms in a direction of the suction face and the second tangential inversion deforms in a direction of the pressure face.

12. A turbomachine compressor comprising at least one rotor wheel made up of blades as claimed in claim 8.

13. A turbomachine comprising a compressor as claimed in claim 12.

14. A turbomachine turbine comprising at least one rotor wheel made up of blades as claimed in claim 8.

* * * * *